United States Patent [19]
Stewart

[11] 3,969,124
[45] July 13, 1976

[54] CARBON ARTICLES

[75] Inventor: Wilford S. Stewart, Plainfield, N.J.

[73] Assignee: Exxon Research and Engineering Company, Linden, N.J.

[22] Filed: Feb. 11, 1974

[21] Appl. No.: 441,434

[52] U.S. Cl. .................................. 106/56; 106/44; 106/65; 252/504; 264/29; 264/81; 264/105; 423/445; 423/448; 423/449; 427/249
[51] Int. Cl.² .................. C04B 35/52; C04B 35/54
[58] Field of Search .............. 264/29, 105, 108, 81, 264/236; 423/447–449, 445; 106/56, 44, 65; 427/228, 249; 252/504

[56] References Cited
UNITED STATES PATENTS

| | | | |
|---|---|---|---|
| 3,084,394 | 4/1963 | Bickerdike et al. | 264/29 |
| 3,444,276 | 5/1969 | Olstowski et al. | 264/29 |
| 3,492,382 | 1/1970 | Redding et al. | 264/29 |
| 3,634,569 | 1/1972 | Emanuelson et al. | 264/29 |
| 3,790,393 | 2/1974 | Cowland et al. | 264/29 |
| 3,796,616 | 3/1974 | Northway | 264/29 |

Primary Examiner—Jeffery R. Thurlow
Attorney, Agent, or Firm—Joseph J. Dvorak

[57] ABSTRACT

High strength shaped carbonaceous articles are prepared by combining particles of carbon, graphite and mixtures thereof that have a predetermined particle size and particle size distribution with resin binder and thereafter shaping and curing the mixture. Typically, the shaped article is pyrolyzed. Additionally, the bulk density of the articles can be increased and the porosity reduced by vapor depositing graphite in the pores of the article.

9 Claims, No Drawings

CARBON ARTICLES

BACKGROUND OF THE INVENTION

The present invention relates to fabricated carbon and graphite products of improved qualities and more particularly to a method for making reinforced carbon and graphite shaped articles.

DESCRIPTION OF THE PRIOR ART

Articles of carbon and graphite have found many commercial applications, particularly where resistance to corrosion, high temperature and thermal shock are required and wherein good electrical and wear characteristics are important criteria in selecting the material to be used. Notwithstanding the commercial utility of carbon and graphite articles, there is an ever-increasing demand for greater quality, particularly increased strength, uniformity and heat resistance of such articles. In many applications, the strength and weight of the carbon and graphite articles are extremely critical, such as in ablation heat shields, for example.

It is known that shaped cabon bodies or articles can be prepared by mixing dry carbon powder with a resin binder. The mixture is then molded into the desired shape, and the article is heated at elevated temperatures to bring about carbonization of the binder. Sometimes temperatures sufficiently high to bring about graphitization are also employed. In this manner shaped carbon and graphite articles are obtained.

In an alternate technique a gaseous hydrocarbon is diffused into a porous graphite article and thereafter the article is heated above the decomposition temperature of the hydrocarbon until the pores are filled with carbon. The resultant article thereby consists of both graphite and carbon.

SUMMARY OF THE INVENTION

In the present invention, there is provided a novel method for preparing shaped articles of carbon, graphite and mixtures thereof that have low porosity and relatively high bulk density. These shaped carbon and graphite articles are optionally reinforced with reinforcing materials such as fibers and whiskers to provide articles with exceptionally high strength.

Basically, the carbon and graphite articles of the instant invention are prepared by combining carbonaceous particles of predetermined particle size and particle size distribution that are selected from the group consisting of carbon or graphite and mixtures thereof with a polymeric resin and shaping the resin and particles into an appropriate article. Alternatively, reinforcing materials such as fibers and whiskers are incorporated in with the carbonaceous particles and resin mixture.

The carbonaceous particles generally will have particle sizes finer than 100 microns and ranging from about 100 microns to about 0.001 microns with a particle size distribution such that about 50 wt. % of the total particles are finer than 10 microns in diameter; however, it is particularly preferred that the carbonaceous particles have particle sizes finer than 50 microns and ranging from about 50.0 to about 0.1 microns and with about 45 wt. % of the particles finer than 10 microns in diameter. The diameter referred to herein is, of course, the equivalent spherical particle diameter of such particles.

Any appropriate polymeric resin binder may be combined with the particles; however, it is particularly preferred that the resin binder be a phenolic resin. Generally, the amount of resin employed will range from about 20 to about 25 wt. % of the total weight of the combined materials.

As indicated, the shaped article may include reinforcing materials such as fibers and whiskers particularly inorganic fibers and whiskers. These inorganic reinforcing materials include silicon nitride, silicon carbide, aluminum oxide, boron nitride, boron carbide and graphite.

Articles constructed according to this invention are useful in the aerospace, metallurgical and chemical fields. In the aerospace field, such articles are useful as heat sinks, ablative heat shields, leading edges, nose cones, etc. In the metallurgical field, these articles are useful as electrodes, anodes, crucibles, extrusion dyes, dies and plungers for hot pressing, resistant tubes, etc. In the chemical field, these articles are useful as chemical tank liners, heat exchangers, pipes, ejector nozzles, etc. These and other features of the instant invention will become apparent from a consideration of the following description and appended claims.

DETAILED DESCRIPTION OF THE INVENTION

A preferred embodiment of this invention comprises combining carbonaceous particles of predetermined particle size with resin binder. The carbonaceous particles are selected from carbon, graphite and mixtures thereof. They are prepared or selected so as to have particles with equivalent spherical diameters generally finer than 100 microns and with a particle size distribution such that about 50 wt. % of the particles are finer than 10 microns in diameter. In a particularly preferred embodiment the particles will have equivalent spherical particle diameters less than about 50 microns with about 45 wt. % of the particles having equivalent spherical diameters less than 10 microns. An especially preferred particle size and particle size distribution is given in Table I.

TABLE I

| Wt. % | Carbonaceous Particles Equivalent Spherical diameter, microns |
|---|---|
| 7 | <0.2 |
| 6 | <0.5 |
| 7 | <1.0 |
| 9 | <2.0 |
| 13.0 | <5.0 |
| 23.0 | <10.0 |
| 25.0 | <20.0 |
| 10.0 | >20.0 |

The carbonaceous particles with the requisite particle size and particle size distribution are obtained by mixing properly selected commercially available particulate solids or by ball milling, grinding and the like. For example, graphite particles of suitable and predetermined particle size are prepared by mixing commercially available graphite powders in the ratios set forth in Table II.

TABLE II

| Amount Wt. % | Trade Name |
|---|---|
| 7% | Asbury 875[1] |
| 13% | Asbury 850[1] |
| 22% | Dixon 200-08[2] |
| 23% | Dixon 200-09[2] |
| 25% | Dixon 200-10[2] |

TABLE II-continued

| Amount Wt. % | Trade Name |
|---|---|
| 10% | Dixon 1110[2] |

[1] Sold by Ashury Mills, Inc., N. J.
[2] Sold by Joseph Dixon Crucible Company, N. J.

A typical formulation for a mixture of graphite and carbon particles having the requisite particle size and particle size distribution is given in Table III.

TABLE III

| Powder Type | Wt. % | Trade Name |
|---|---|---|
| Carbon | 7 | Stirling MT[1] |
| Graphite | 13 | Ashury 850[2] |
| Graphite | 22 | Dixon 200-08[3] |
| Graphite | 23 | Dixon 200-09[3] |
| Graphite | 25 | Dixon 200-10[3] |
| Carbon | 10 | Darco S-51[4] |

[1] Sold by Cabot Corp., Mass.
[2] Sold by Ashury Mills, Inc., N. J.
[3] Sold by Joseph Dixon Crucible Company, N. J.
[4] Sold by Atlas Chemical Industries, Del.

Generally, when using a mixture of carbon and graphite particles of the predetermined particle size it is preferred that the ratio of graphite to carbon be about 9:1 although greater amounts of carbon powder may be employed.

As stated above, the carbonaceous particles of requisite particle size and particle size distribution are combined with a resin. Any appropriate resin may be employed; however, it is particularly preferred in the practice of the present invention that a phenolic resin be employed.

Although many different combinations of aldehydes and phenolic compounds are possible for resin formation, generally phenol and formaldehyde are overwhelmingly employed to the exclusion of most other possible compounds in the manufacture of phenolic resins; and, it is this type of phenolic resin which is preferably employed in the present invention.

In the manufacturing process, the phenol-formaldehyde resin may pass through three stages: "A stage" or resole stage; a "B stage" or resitol stage; and, a "C stage" or resit stage, which is the actual or final cure of the phenolic part in a mold. In some processes the third stage is eliminated and an acid catalyst is used to condense the formaldehyde and the phenol. This resin is considered generally to be non-curing; however, it is possible to use an activator such as hexamethylenetetramene for further curing of the resin.

In any event, resins of both the 2-stage and 3-stage type are contemplated by the present invention; although it is particularly preferred to use a resin of the 3-stage type.

Additionally, it should be recognized that phenolic resins can be modified by the addition of numerous other materials such as plasticizers, lubricants and the like to enhance the processing of the article.

In any event, in the preferred embodiment of the present invention from about 20 to 50 wt. % of resin binder is employed, based on the total weight of binder and particulate material. However, it should be recognized that generally from 20 to 25 wt. % of resin binder might be used with advantage. After mixing the carbonaceous particles with the binder, the mixture is then formed into the desired shape and pyrolyzed.

The pyrolysis conditions will depend upon numerous factors including the nature of the resin binder. Generally, however, pyrolysis will be promoted by heating at temperatures in the range of 250° to 1400°C. in a non-oxidizing atmosphere. Thus, pyrolysis can be conducted under reduced pressures and even in an inert or reducing atmosphere. Indeed, in one embodiment of the instant invention pyrolysis is conducted at temperatures between 1300°C. and 1400°C. at atmospheric pressures and in the presence of hydrogen, a hydrocarbon such as methane, carbon dioxide and carbon monoxide thereby preferentially producing pyrolytic graphite. Significantly, by using the chemical vapor deposition conditions favoring formation of pyrolytic graphite, the articles having densities up to 2.00 g/cm$^3$ have been prepared.

In another embodiment of the present invention, the carbonaceous particles of predetermined particle size and particle size distribution are combined with phenolic resin binder and the phenolic resin is then partially cured, that is, it is "B-staged". Thereafter the combined particles and resin are stored as a preimpregnated material. The preimpregnated material, or pre-preg, is used when desired by shaping and pyrolyzing it.

The strength of the articles according to the present invention is greatly enhanced, of course, by the addition of reinforcing materials such as carbon and graphite fibers, silicon carbide whiskers, boron carbide whiskers, boron nitride whiskers and the like. These reinforcing materials can make up as much as from 10 to 60 wt. % of the total weight of the article. Generally, however, the whiskers or fiber reinforcing material added will range from 10 to 30 wt. %, based on the total weight of the article. Typically, the reinforcing material will be combined with the carbonaceous particles and resin prior to forming the mixture into the desired shape.

The following specific examples will serve further to illustrate the invention.

EXAMPLE 1

A graphite powder having the particle size and particle size distribution set forth in Table I was prepared by mixing the graphite materials set forth in Table II in the amounts specified in that table. Seven parts by weight of the graphite particle of predetermined particle size and particle size distribution was mixed in a Hobart mixer, sold by Hobart Manufacturing Co., N.J., with three parts by weight of a commercially available phenolic resin and one and a half parts by weight of absolute ethanol. The phenolic resin used was sold by Monsanto Co., Mo., as phenolic resin SC-1008. The resultant mixture of resin and graphite particles was charged into a warm compression mold heated for 30 minutes at 60°C. and then compression molded at 163°C. and 700 lbs. pressure for one hour. After cooling for one hour, the molded article was post cured at 235°C. for 2 hours, and thereafter pyrolyzed by raising the temperature at about 10°C. per hour until the temperature was raised to 1400°C. This took 12 hours. The resultant article had a flexural strength of $4.5 \times 10^3$ psi and a flexural modulus of $0.76 \times 10^6$ psi as measured by ASTM Test Method D-790 and D-747, respectively.

EXAMPLE 2

The procedure outlined above was followed with the exception that randomly oriented silicon carbide whiskers were added to the graphite powders and resin. The proportion of the components are as follows:

| Components | % by Weight |
|---|---|
| Graphite | 35 |
| Phenolic Resin | 25 |
| B-silicon carbide Whiskers | 40 |

The beta-silicon whiskers were prepared by the standard vapor-liquid-solid process for making such whiskers.

The same "A staging", "B staging", curing cycles and pyrolysis conditions were followed as in Example 1 and the resulting composite had a flexural strength of $5.8 \times 10^3$ psi and a flexural modulus of $0.81 \times 10^6$ psi.

EXAMPLE 3

The following components and the proportions listed were provided.

| Components | % by Weight |
|---|---|
| Graphite | 15 |
| Phenolic Resin | 25 |
| Graphite Fiber | 60 |

The graphite fiber employed was a unidirectional graphite fiber tow obtained from Hercules, Inc., Delaware.

The above components were processed, mixed and molded as in Example 2. The resultant product had a flexural strength of $11.7 \times 10^3$ psi and a flexural modulus of $3.7 \times 10^6$ psi.

EXAMPLE 4

This example demonstrates the technique of preparing a prepreg in accordance with the present invention. In this instance the following materials were employed.

| Components | % By Weight |
|---|---|
| B-silicon carbide Whiskers | 40 |
| Graphite | 50 |
| Phenolic Resin | 10 |

The beta-silicon carbide whiskers were prepared by the standard vapor-liquid-solid process for making such whiskers.

The graphite particles having the predetermined particle size and particle size distribution of Table 1 were prepared as in Example 1. The phenolic resin used was also the same resin as that of Example 1.

The ingredients were blended substantially as follows. First the carbon and then the graphite were mixed with the fibers and then added to the phenolic resin. After combining the whiskers, carbon and graphite with the resin, the resultant material was extruded through a tapered orifice onto an 8 inch drum and partially dried with a hot air gun. The sheet of threads was removed from the drum and "B-staged" for 15 minutes at room temperature at a reduced pressure of 125 mm/Hg followed by "B-staging" for a half hour at 82°C. under a reduced pressure of 125 mm/Hg. The "B-stage" material is then stored and can be cut in strips for use in compression molding as desired.

EXAMPLE 5

This example illustrates the technique for increasing the bulk density of the carbon articles by chemical vapor deposition.

Carbonaceous articles prepared in accordance with the procedure of Examples 1 and 2 were placed in a furnace having a cross sectional area of 58.7 cm². Separate gas streams were fed into a manifold and then into the furnace The flow rates and gases are given in Table IV below.

TABLE IV

| Gas | Flow Rate, liters/min. |
|---|---|
| Nitrogen | 0.093 |
| Hydrogen | 0.550 |
| Carbon dioxide | 0.010 |
| Carbon monoxide | 0.040 |
| Methane | 0.013 |

The articles were heated at 1300°C. to 1400°C., and at atmospheric pressures. As a result of this treatment the porosities of the articles were reduced and the bulk densities increased.

What is claimed is:

1. A process for the manufacture of low porosity, high density shaped carbonaceous articles comprising: combining carbonaceous particles of predetermined particle size and particle size distribution with a polymeric resin binder, forming the resin binder and particles into a shaped article, curing the so shaped resin binder and particles and thereafter pyrolyzing the article so shaped and cured, said carbonaceous particles being selected from the group consisting of carbon, graphite and mixtures thereof and said particles having particle sizes ranging from about 100 microns to about 0.001 microns with about 50 wt. % of the carbonaceous particles finer than 10 microns in equivalent spherical diameter.

2. The process of claim 1 wherein 3 to 12 wt. % of the particles range in size from 0.2 microns to 0.001 microns.

3. The process of claim 1 wherein the particles have equivalent spherical diameters finer than 50 microns and 45 wt. % of the particles range between about 10.0 to about 0.1 microns in diameter.

4. The process of claim 1 wherein the resin binder is a phenolic resin and is present in an amount ranging from about 20 to 25 wt. % based on the total weight of the shaped article.

5. The process of claim 1 including incorporating from about 10 to about 60 wt. % of a reinforcing material with the resin and carbonaceous particles prior to forming into a shaped article.

6. The process of claim 5 wherein the reinforcing material selected from the group consisting of graphite fibers, silicon carbide, silicon nitride and aluminum oxide whiskers, boron nitride, boron carbide fibers and mixtures thereof.

7. The method of claim 1 wherein the shaped article after being pyrolyzed is thereafter treated at temperatures in the range from about 1300°C. to 1400°C. in the presence of a gaseous mixture of $N_2$, $H_2$, CO, $CO_2$ whereby pyrolytic graphite is deposited on and in the shaped articles.

8. The method of preparing a shaped, carbonaceous article comprising:
  a. combining carbonaceous particles with from about 20 to about 25 wt. % of a phenolic resin binder, said carbonaceous particles having equivalent spherical diameters less than about 100 microns and with from about 50 wt. % of said particles having equivalent spherical diameters finer than about 10 microns said carbonaceous particles selected from carbon, graphite and mixtures thereof;
  b. forming the mixture of resin and particles into a shaped article; and,
  c. treating the shaped article under conditions sufficient to cure the resin.

9. The process of claim 8 including the step of pyrolyzing said shaped and cured article at temperatures in the range of about 250°C. to about 1400°C.

* * * * *